UNITED STATES PATENT OFFICE.

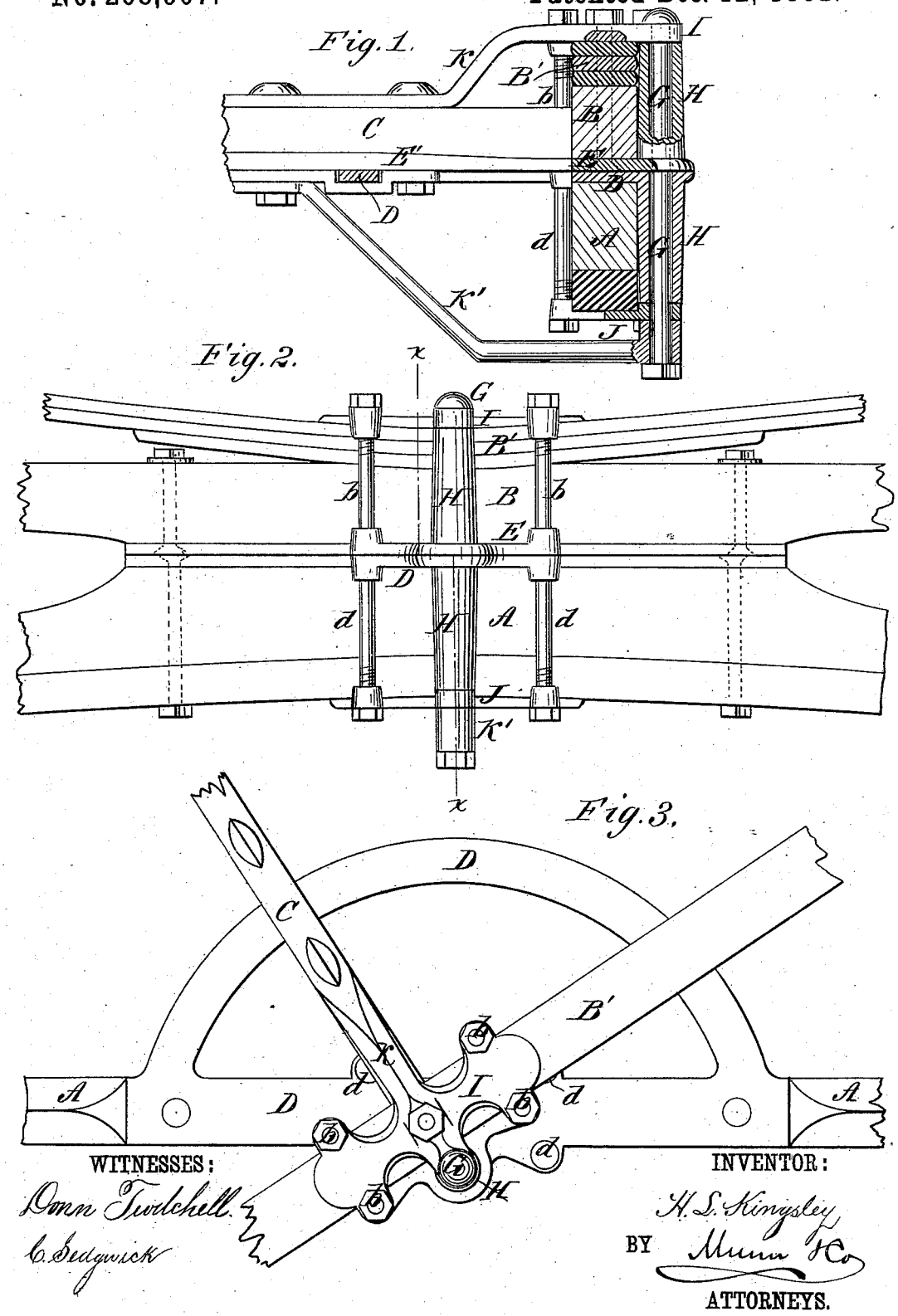

HORACE L. KINGSLEY, OF RACINE, WISCONSIN.

VEHICLE KING-BOLT CONNECTION.

SPECIFICATION forming part of Letters Patent No. 268,907, dated December 12, 1882.

Application filed July 21, 1882. (Model.)

*To all whom it may concern:*

Be it known that I, HORACE L. KINGSLEY, of Racine, in the county of Racine and State of Wisconsin, have invented a new and useful Improvement in King-Bolt Connections for Wagons and other Vehicles, of which the following is a full, clear, and exact description.

Reference is to be had to the accompanying drawings, forming part of this specification, in which similar letters of reference indicate corresponding parts in all the figures.

Figure 1 represents a vertical section on the irregular line *x x* in Fig. 2, in line with the reach, through the axle and head-block, with king-bolt and fifth-wheel attachments, all constructed in accordance with my invention. Fig. 2 is an elevation in direction of the length of the axle of the same, and Fig. 3 a plan thereof.

The object of this invention is to reduce the cost of construction of that portion of a vehicle or carriage gear which is connected with the king-bolt, as well as to increase its strength and durability and to secure for it a neat and substantial appearance.

A in the drawings indicates the front axle of a wagon or other vehicle; B, its head-block, and C the reach, which connects with the rear axle.

D is the lower friction-plate, mounted on the axle and of D shape, as in other fifth-wheel arrangements, and E the upper friction-plate, connected, as usual, with the reach-plate E'.

G is the king-bolt, which is provided with a continuous cover by means of sockets or shells H H, attached respectively to the friction-plates D E.

The head-block B or spring-cap, where a spring, B', is used, has its center extending outward, forming an eye through which the king-bolt passes, said eye being made in a top plate, I, and a corresponding eye for the king-bolt being formed in a bottom plate, J, on the under side of the axle. These eyes are in line with the sockets or shells H H, attached to the friction-plates D E, and arranged outside of the axle and head-block, thus avoiding all cutting away or weakening of the axle and head-block and giving increased strength to them.

The top plate, I, and bottom plate, J, may be secured to the friction-plates D and E, respectively, by outside bolts, *b b* and *d d*, respectively, and braces K K' be extended to the reach E and reach-plate E'; or they may be secured by bolts passing through the head-blocks and axle, or by clips or in any other suitable manner. As here shown, the upper brace, K, is formed integral with plate I, as a backward extension thereof, and the lower brace, K', has an eye-connection with the king-bolt below plate J, and is bolted at its back end to the reach. This construction and combination of parts connected with the king-bolt is comparatively inexpensive, has a neat and substantial appearance, and is strong and durable.

I claim—

The combination, with a king-bolt socket formed of two sections, H H, attached to the friction-plates D E in front of axle, of the plates I J, carrying an eye, respectively, at the top and bottom of said socket, and secured to said friction-plates by outside bolts, *d d*, provided with end nuts, as shown and described.

HORACE L. KINGSLEY.

Witnesses:
 E. W. MARCHER,
 CHAS. H. WASHBURN.